United States Patent [19]
Ishikawa et al.

[11] Patent Number: 5,565,911
[45] Date of Patent: Oct. 15, 1996

[54] TELECONFERENCE SYSTEM WITH IMPROVED RESOLUTION OF TRANSMITTED PICTURE

[75] Inventors: Tomikazu Ishikawa; Masayuki Takano; Shohei Hatake, all of Kanagawa, Japan

[73] Assignee: Sony Corporation, Tokyo, Japan

[21] Appl. No.: 392,489

[22] Filed: Feb. 23, 1995

Related U.S. Application Data

[63] Continuation-in-part of Ser. No. 975,525, Nov. 12, 1992, abandoned.

[30] Foreign Application Priority Data

Nov. 13, 1991 [JP] Japan ..................................... 3-297364

[51] Int. Cl.$^6$ ..................................................... H04N 7/15
[52] U.S. Cl. ................................................. 348/15; 348/17
[58] Field of Search .......................... 358/85, 86; 379/53, 379/54, 90, 93, 96, 100, 102; 348/12, 13, 14, 15, 16, 17, 18, 19, 20; H04N 7/14, 7/15, 7/10

[56] References Cited

FOREIGN PATENT DOCUMENTS

| 0041359 | 2/1989 | Japan . | |
| 0049385 | 3/1991 | Japan | H04N 7/14 |
| 0160889 | 7/1991 | Japan | H04N 7/15 |
| 0049790 | 2/1992 | Japan | H04N 7/15 |
| 0265088 | 9/1992 | Japan | H04N 7/14 |

*Primary Examiner*—David E. Harvey
*Attorney, Agent, or Firm*—Jay H. Maioli

[57] ABSTRACT

The present invention is directed to a teleconference system in which display data is transmitted at least between a data transmitting apparatus and a data receiving apparatus. The data receiving apparatus comprises a display device, a data memory, a control information memory for storing therein display control information representative of an order in which transmitted display data is displayed, and a controller. The controller is responsive to display switching information transmitted from the data transmitting apparatus to read the display control information stored in the control information memory, sequentially reads the display data from the data memory in accordance with the display order represented by the read-out display control information and supplies the same to the display device. The display data includes previously stored display data and current display data, and the display control information includes transmission code data indicating whether the display data is advance transmission data or real time transmission data.

12 Claims, 10 Drawing Sheets

| SCENARIO NUMBER | SYSTEM ID CODE | INDIVIDUAL CODE | TRANSMISSION CODE |
|---|---|---|---|
| 1 | DOCUMENT | DOCUMENT CODE 1 | ADVANCE TRANSMISSION |
| 2 | STILL | 4TH FRAME | ADVANCE TRANSMISSION |
| 3 | DOCUMENT | DOCUMENT CODE 3 | ADVANCE TRANSMISSION |
| 4 | VTR | 1ST INDEX | ADVANCE TRANSMISSION |
| 5 | VTR | TIME CODE | REAL TIME TRANSMISSION |
| 6 | DOCUMENT | DOCUMENT CODE 4 | ADVANCE TRANSMISSION |
| • | • | • | • |
| • | • | • | • |
| • | • | • | • |
| • | • | • | • |

FIG. 4

| SCENARIO NUMBER | SYSTEM ID CODE | INDIVIDUAL CODE | TRANSMISSION CODE |
|---|---|---|---|
| 1 | DOCUMENT | DOCUMENT CODE 1 | ADVANCE TRANSMISSION |
| 2 | STILL | 4TH FRAME | ADVANCE TRANSMISSION |
| 3 | DOCUMENT | DOCUMENT CODE 3 | ADVANCE TRANSMISSION |
| 4 | VTR | 1ST INDEX | ADVANCE TRANSMISSION |
| 5 | VTR | TIME CODE | REAL TIME TRANSMISSION |
| 6 | DOCUMENT | DOCUMENT CODE 4 | ADVANCE TRANSMISSION |
| ⋮ | ⋮ | ⋮ | ⋮ |

FIG. 5

| ADDED INFORMATION | IMAGE DATE | ADDED INFORMATION | IMAGE DATE | |
|---|---|---|---|---|

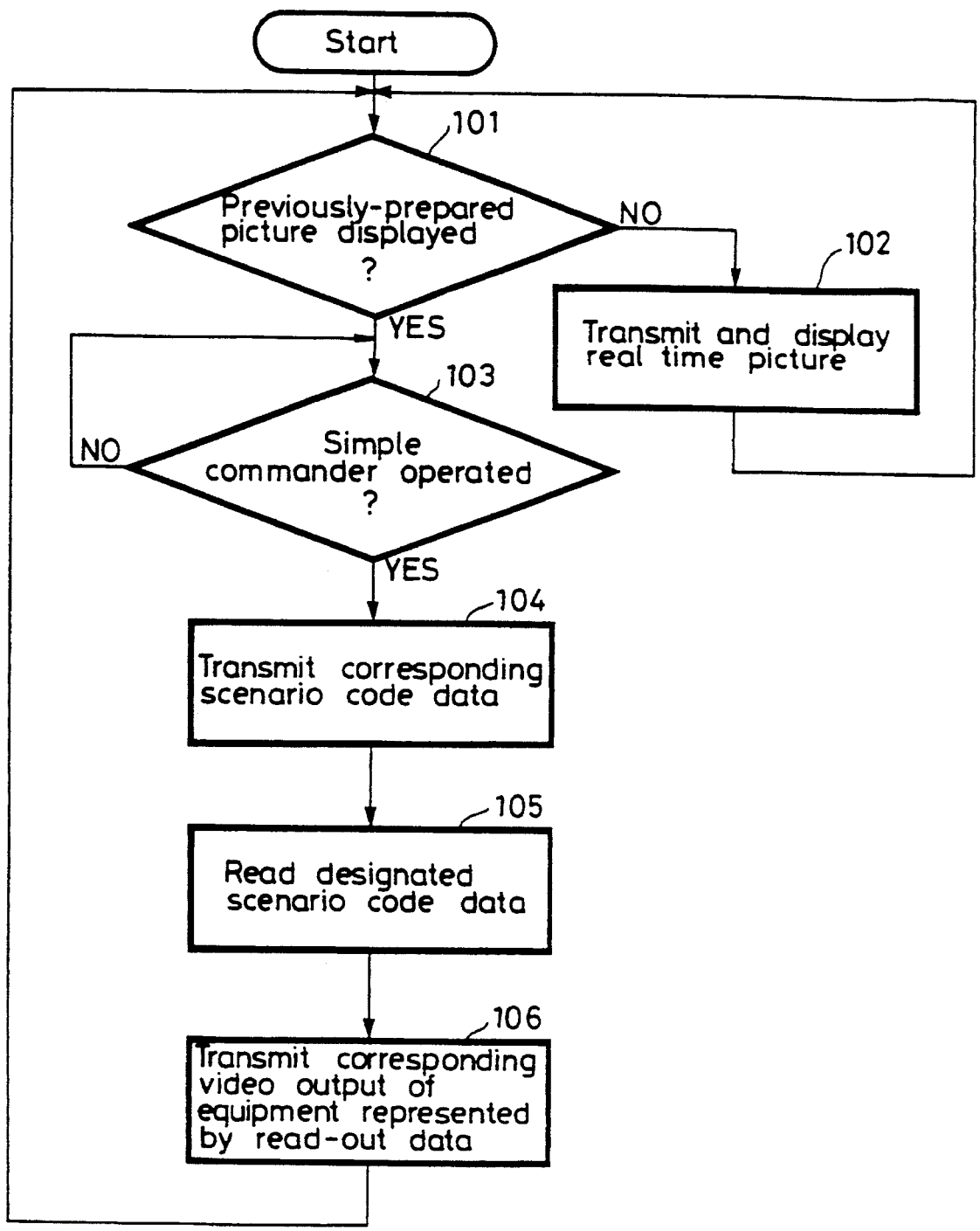

FIG. 9

| SCENARIO NUMBER | SYSTEM ID CODE | INDIVIDUAL CODE | TRANSMISSION CODE |
|---|---|---|---|
| 1 | DOCUMENT | DOCUMENT CODE 1 | ADVANCE TRANSMISSION |
| 2 | STILL | 4TH FRAME | ADVANCE TRANSMISSION |
| 3 | DOCUMENT | DOCUMENT CODE 3 | ADVANCE TRANSMISSION |
| 4 | VTR | 1ST INDEX | ADVANCE TRANSMISSION |
| 5 | — | — | REAL TIME TRANSMISSION |
| 6 | DOCUMENT | DOCUMENT CODE 4 | ADVANCE TRANSMISSION |
| ... | ... | ... | ... |

TELECONFERENCE SYSTEM WITH IMPROVED RESOLUTION OF TRANSMITTED PICTURE

This application is a continuation-in-part of U.S. patent application Ser. No. 07/975,525, filed Nov. 12, 1992, now abandoned.

BACKGROUND OF THE INVENTION

1. Field of the Invention

The present invention relates to a teleconference system that includes a wide variety of television monitors and video cameras.

2. Description of the Prior Art

Several teleconference systems have been proposed so far, such as that shown in Japanese Laid-Open Patent Publication No. 63-65789.

FIG. 1 schematically shows a previously proposed teleconference system in use. As shown in FIG. 1, this kind of teleconference system includes television monitors 18a, 38a which are respectively installed in first and second conference rooms 10, 30 to display situations of one conference room on the television monitor of the other conference room so that a conference can be held between the respective occupants of conference rooms 10, 30. Generally, data such as video data are transmitted between the two conference rooms 10, 30 via a telephone network line such as an integrated services digital network (ISDN) or the like. Therefore, the amount of data to be transmitted is limited by the telephone network line and an image such as an ordinary television broadcasting image having a high resolution cannot be transmitted in a real time fashion. It is therefore customary that the video image signal is transmitted in a compressed form.

Although an image displayed on the receiving side by the conventional teleconference system is deteriorated in resolution and cannot satisfactorily follow a moving image that is moving at high speed, this deterioration of resolution is not so important inasmuch as the teleconference system is utilized because only the state of one conference room is displayed on the television monitor of the other conference room.

When an electronic conference is held according to the conventional teleconference system, it is customary that not only the state of one conference room is displayed on the television monitor of the other conference room but also pictures of previously-prepared documents or the like are displayed on the television monitor of the other conference room. According to the conventional teleconference system, not only can the conference be conducted but also a variety of presentations can be made smoothly.

When various documents are displayed on the television monitor as described above, however, deterioration of resolution does become a problem. That is, when the document or the like is transmitted to and displayed on the television monitor in the other conference room, the deterioration of resolution becomes a serious problem because a displayed picture must have a resolution sufficient so that characters or the like written on the document can be visually confirmed. When a video signal reproduced from a video tape is transmitted to the receiving side, and if the video signal is compressed and then transmitted according to the conventional teleconference system, then the picture of the moving object is deteriorated considerably in resolution.

Further, such presentation involves a cumbersome operation. That is, various video information portions must be sequentially transmitted to the receiving side in accordance with the progress of the conference. Therefore, the conventional teleconference system needs an expert to operate the transmitting apparatus in addition to the conference attendees.

OBJECTS AND SUMMARY OF THE INVENTION

It is an object of the present invention to provide an improved teleconference system in which the aforesaid shortcomings and disadvantages of the prior art can be eliminated.

More specifically, it is an object of the present invention to provide a teleconference system in which the presentation of pictures and images can be carried out by simple operations not requiring a skilled operator.

As an aspect of the present invention, there is provided a teleconference system in which a video signal is transmitted at least between a video transmitting apparatus and a video receiving apparatus. The video receiving apparatus comprises a display device, a video memory, a control information memory for storing therein display control information representative of an order in which the video information is displayed, and a controller. The controller is responsive to display switching information transmitted from the video transmitting apparatus to read the display control information stored in the control information memory and sequentially reads the video information from the video memory in accordance with the display order represented by the read-out display control information and supplies the same to the display device. The video images that are to be displayed are set forth beforehand in a so-called scenario, which may include images taken at the moment of the conference as well as images already existing and stored on the appropriate record medium. These existing images can be transmitted from one conference room and received and stored in the other conference room before the conference actually takes place.

BRIEF DESCRIPTION OF THE DRAWINGS

A better understanding of other objects, features, and advantages of the present invention can be gained from a consideration of the following detailed description of an illustrative embodiment of the present invention, in conjunction with the figures of the accompanying drawings, wherein:

FIG. 4 is a diagram showing the contents stored in the scenario storage memory used in the teleconference system of the embodiment shown in FIG. 2;

FIG. 5 is a diagram of a format used to explain the state in which image data is transmitted in the teleconference system of the embodiment shown in FIG. 2;

FIG. 6 is a flow chart explaining operation of the teleconference system of the embodiment shown in FIG. 2;

FIG. 9 is a diagram showing the contents stored in the scenario storage memory used in the teleconference system of the embodiment shown in FIG. 2, including advanced transmission data and current video data;

DETAILED DESCRIPTION OF THE PREFERRED EMBODIMENT

A teleconference system according to an embodiment of the present invention will now be described with reference to the drawings.

Figure 2:
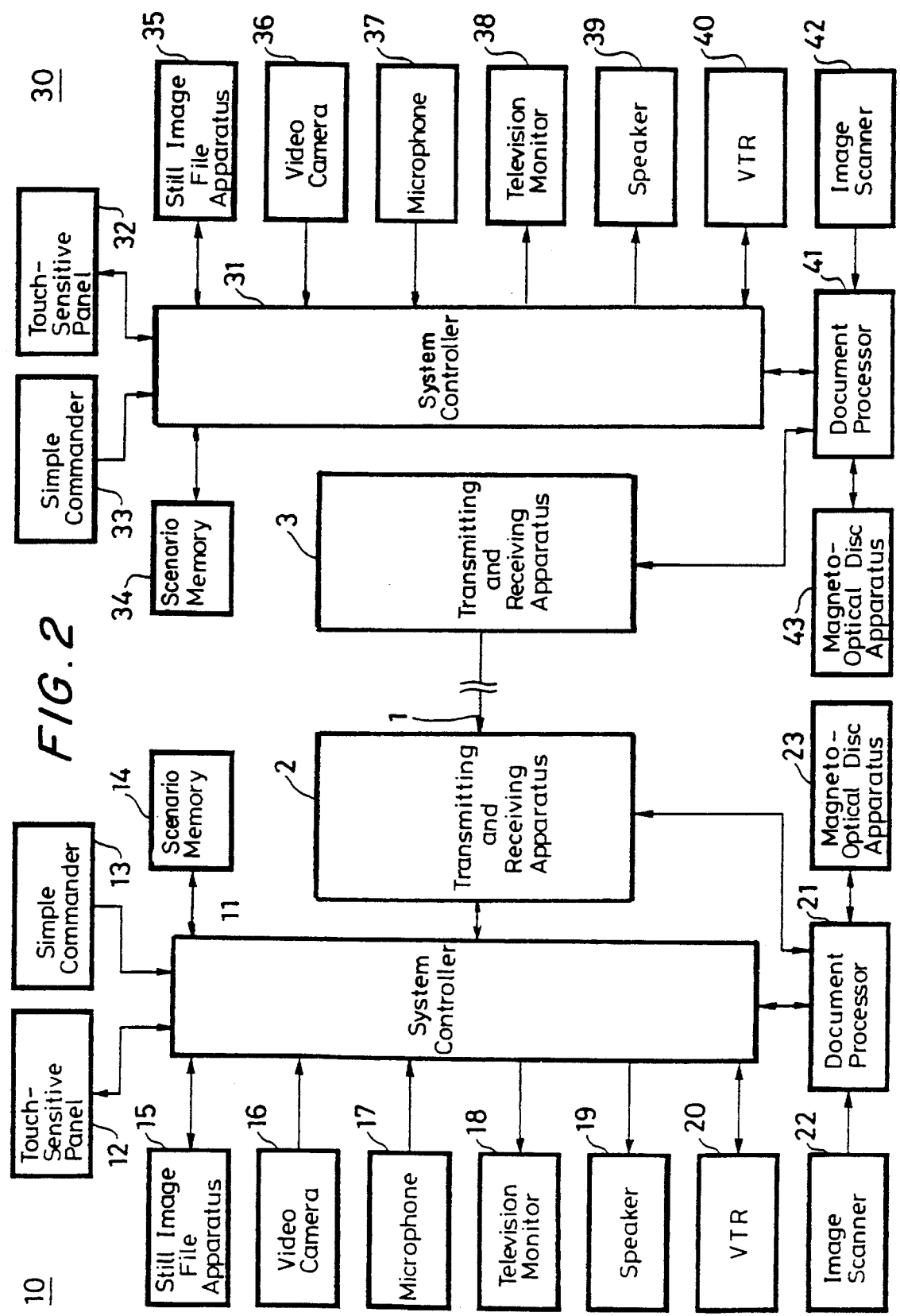
FIG. 2 is a block diagram showing a teleconference system according to an embodiment of the present invention.

According to this embodiment, a teleconference system is arranged as shown in FIG. 2 of the accompanying drawings.

In FIG. 2, reference numeral 10 depicts a first conference room and reference number 30 depicts a second conference room. The first and second conference rooms 10, 30 are connected through a telephone network line 1 such as an ISDN or the like. The first and second conference rooms 10, 30 are fundamentally the same in arrangement and, therefore, the first and second conference rooms 10, 30 will be described below at the same time.

As shown in FIG. 2, in the two conference rooms 10, 30, transmitting and receiving apparatus 2, 3 are connected to the telephone network line 1 and system controllers 11, 31, are respectively connected to the transmitting and receiving apparatus 2, 3. The system controllers 11, 31 are adapted to control a variety of operations, such as transmission, reception, and reproduction of video and audio signals in the first and second conference rooms 10, 30. Touch-sensitive panels 12, 32 and simple commanders 13, 33 are connected to the respective system controllers 11, 31, whereby various operations are carried out by the users of the touch-sensitive panels 12, 13. Relatively simple operations are carried out by using the so-called simple commanders 13, 33. Scenario storage memories 14, 34 are connected to the system controllers 11, 31 and can store therein information concerning the predetermined scenario of the conference, such as the display order set on the basis of the operation of the touch-sensitive panels 12, 32 and scenario information transmitted thereto from the other conference room through the telephone network line 1.

Various video and audio equipment is connected to the system controllers 11, 31 in the respective conference rooms 10, 30. More specifically, to the system controllers 11, 31, there are connected still image file apparatus 15, 35 in which video floppy discs capable of recording therein a video signal of several dozens of frames as a still picture are loaded, video cameras 16, 36 for taking a picture of the inside of the conference room, microphones 17, 37 for picking up sounds within the conference rooms 10, 30, television monitors 18, 38 for displaying a variety of pictures, speakers 19, 39 for emanating sounds, and video tape recorders (VTRs) 20, 40 into which video tape cassettes are loaded. A plurality of equipment such as television monitors 18, 38 and so on are installed in the first and second conference rooms 10, 30. Video and audio signals from respective video equipment can be transmitted from one to the other conference room under the control of the system controllers 11, 31. Upon transmission, the video and audio signals may be compressed with a large compression ratio and transmitted in a real time fashion. Alternatively, a video signal or the like need not be compressed but can be transmitted during a long period of time and stored for later use, as will be described later.

Document processors 21, 41 are respectively connected to the system controllers 11, 31, and processing such as display, recording and transmission of documents is controlled by the document processors 21, 41. The document processors 21, 41 are connected to image scanners 22, 42 for reading documents and magneto-optical disc apparatus 23, 43 which serve as document files to store read-out data and document data to be transmitted as character code data and graphic data. The document processors 21, 41 are also connected directly to the transmitting and receiving apparatus 2, 3 so that data from the document processors 21, 41 can be directly transmitted to the other conference room via the telephone network line 1. Character code data and graphic data from the magneto-optical disc apparatus 23, 43 are converted by the document processors 21, 41 into display video data. The display video data is then supplied to the system controllers 11, 31 and document data are displayed on the picture screens of the television monitors 18, 38 connected to the system controllers 11, 31.

These video equipment and magneto-optical disc apparatus can reproduce data such as video signals or the like from recording media loaded onto respective equipment and can record on the respective recording media corresponding data supplied thereto from the other conference room via the telephone network line 1. The recording can be carried out under the control of the system controllers 11, 31 and the document processors 21, 41. Also, this recording can be carried out by operating the touch-sensitive panels 12, 32 of the first and second conference rooms 10, 30 and also on the basis of control data transmitted from the other conference room via the telephone network line 1.

Figure 1:
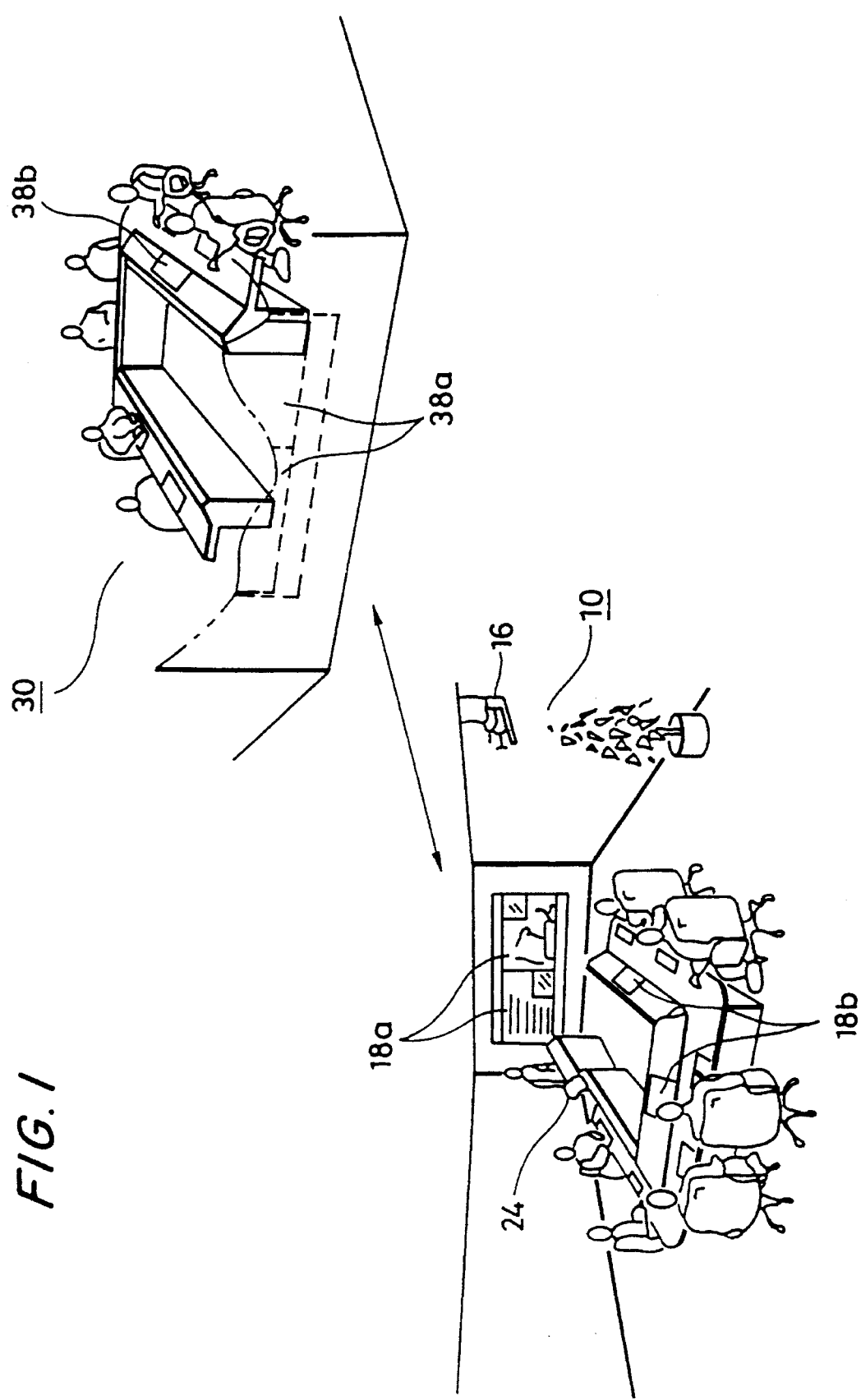
FIG. 1 is a pictorial representation used to explain the state of a teleconference system in use.
Figure 3:
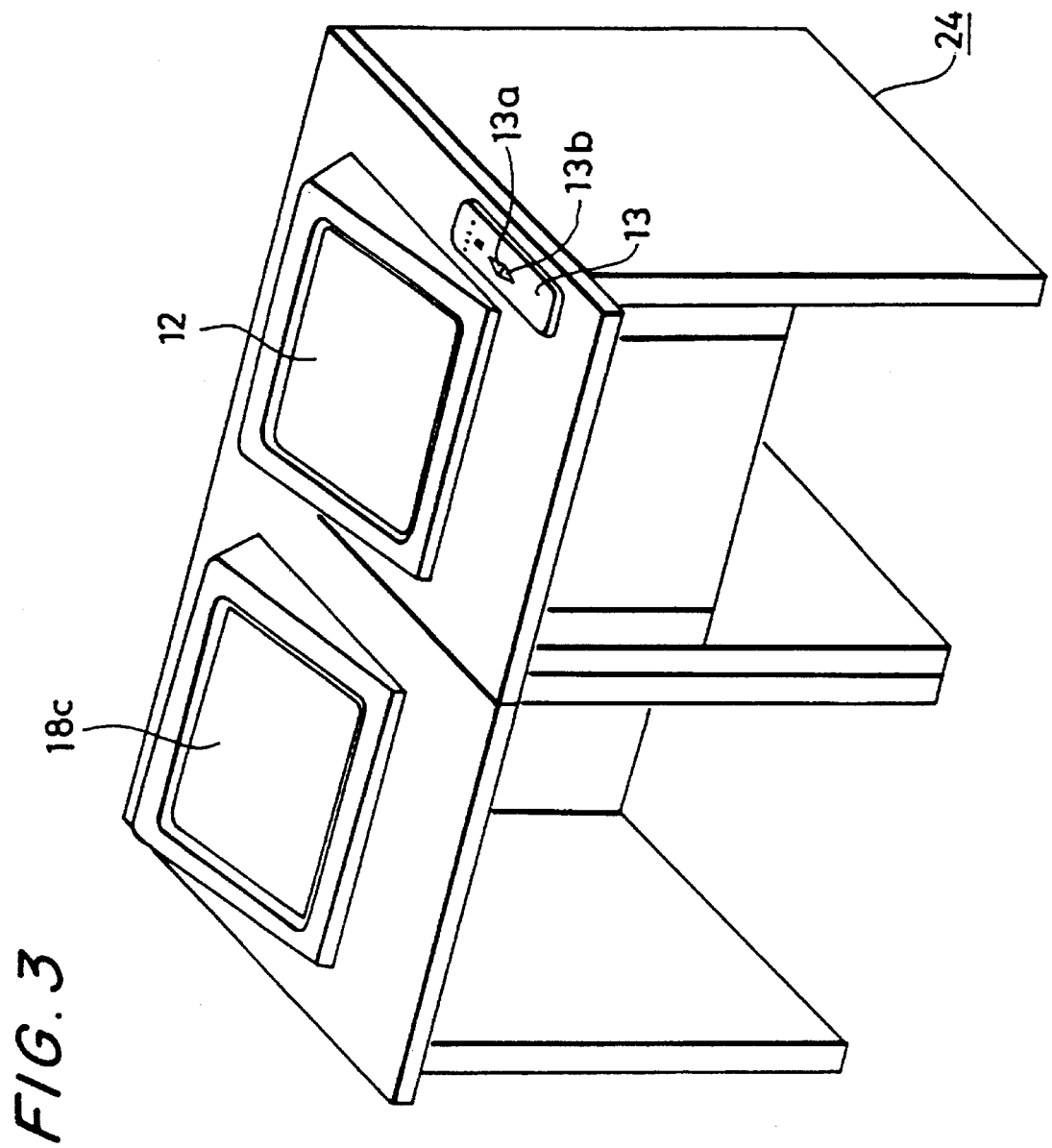
FIG. 3 is a perspective view showing an example of a console used in the teleconference system of the embodiment shown in FIG. 2.

Practical examples of the conference rooms will be described also with reference to FIG. 1 in which a plurality of large television monitors 18a are installed on the wall of the first conference room 10, for example, and a plurality of small television monitors 18b are installed on the table. There is also provided a console 24 on which, as shown in FIG. 3, there are disposed the touch-sensitive panel 12 and the simple commander 13. A television monitor 18c also is installed on the console 24. The touch-sensitive panel 12 is energized to permit selections in accordance with the operations displayed on the picture screen thereof, when the respective portions displayed on the picture screen are touched by the user. The simple commander 13 includes a forward key 13a and a backward key 13b, whereby the pictures that are to be displayed in accordance with the scenario that was previously set can be advanced or backed up. According to the thus arranged console 24, the user can instruct various operations such as the transmission of video signals or the like by operating the touch-sensitive panel 12 and the simple commander 13, while visually confirming the picture being displayed on the television monitor 18c.

An example of a conference held by utilizing the above teleconference system will be described in the following.

Let it be assumed herein that pictures are to be displayed on the respective television monitors 18 (18a, 18b, 18c) of the first conference room 10 and the respective television monitors 38 (38a, 38b) of the second conference room 30 by operating the console 24 in the first conference room 10 in order to make a presentation. In this embodiment, a so-called scenario must be set before the conference is started, that is, the pictures necessary for the presentation and the display order of the pictures are set beforehand in the scenario. Pictures that can be included in the scenario might be still pictures recorded on the video floppy disc of the still image file apparatus 15, moving pictures recorded on the video tape of the VTR 20, and documents recorded by the magneto-optical disc apparatus 23. According to this embodiment, the still pictures recorded on the video floppy disc can be individually designated by frame codes, the moving pictures recorded on the video tape can be individually designated by index codes, and the documents recorded on the magneto-optical disc can be individually designated by document codes. As the scenario, pictures to be displayed can be specified by designating the ID (identification) code of the system that reproduces a corresponding picture, the respective individual data codes, and a transmission code indicating advance transmission or real time transmission.

Let it now be assumed that a document of document code 1 recorded on the magneto-optical disc, a still picture of frame code 4 recorded on the video floppy disc, a document of document code 3 recorded on the magneto-optical disc and a moving picture of index code 4 recorded on the video tape, . . . are to be displayed, in that order. First, this scenario consisting of the display order, system ID code, individual data code, and transmission code is stored in the scenario storage memory 14 that is connected to the system controller 11 of the first conference room 10 by operating the touch-sensitive panel 12 of the console 24. FIG. 4 of the accompanying drawings shows the state in which respective data are stored in the memory 14 that includes storage areas in which the system ID code, data codes, and transmission codes are stored for every scenario code. Therefore, the respective data are stored in the memory 14, in the above-mentioned sequential order.

After the setting of the scenario is finished, corresponding image data or document data recorded on recording media in the respective equipment are read out therefrom under the control of the system controller 11 and the document processor 21 and then transmitted to the second conference room 30 via the telephone network line 1. If the image data or document data is recorded as analog data, then such analog data is converted into digital data before being transmitted. At that time, image data read from respective video equipment need not be compressed, or is compressed with a relatively small compression ratio, and is then transmitted using a relatively long transmission time. Because this data is an advance transmission the time it takes to transmit the data is not important.

FIG. 5 of the accompanying drawings shows a format of the transmission data corresponding to FIG. 4. As shown in FIG. 5, data is transmitted in the form of a frame structure, which is not related to the frame of a video signal, wherein data such as the system ID code, the individual code, and the scenario code are added to the image data to form one frame.

When the frames of the image data transmitted from the first conference room 10 are received by the second conference room 30, the received image data is recorded on the recording medium of the particular equipment designated by the added information under the control of the system controller 31 and the document processor 41. Data concerning the scenario, such as the system ID code, the individual code, and the scenario code represented by the data added to the image data are stored in the scenario storage memory 34 connected to the system controller 31. Therefore, when the transmission of all image data is finished, the same scenario as that stored in the scenario storage memory 14 in the first conference room 10 is stored in the scenario storage memory 34 in the second conference room 30 and all advance transmission data is stored in the respective recording units.

The preparation is completed once the image data and the like have been transmitted to the second conference room 30.

A controlled state of a conference held by utilizing the pictures thus prepared will be described with reference to the flow chart forming FIG. 6. In this embodiment, the pictures displayed in the two conference rooms 10, 30 are switched under the control of the first conference room 10.

Referring to FIG. 6, following the start of operation it is determined in decision step 101 whether a previously-prepared and transmitted in advance picture should be displayed or whether a real time picture from the video camera or the like is to be displayed. If it is determined that a real time picture is next to be displayed, as represented by a NO at decision step 101, then the processing proceeds to step 102, in which video signals from the video cameras or VTR, for example, are compressed and transmitted through the telephone network line 1 from the first and second conference rooms 10, 30 to one another so that the pictures of such video signals are displayed in substantially real time on the television monitors 18, 38 of the first and second conference rooms 10, 30.

If the previously-prepared picture is next to be displayed as represented by a YES at decision step 101, then the processing proceeds to the next decision step 103 performed by the system controller 11 of the first conference room 10 that determines whether the simple commander 13 on the console 24 is operated. If the forward key 13a or backward key 13b of the simple commander 13 on the console 24 is operated as represented by a YES at decision step 103, then the processing proceeds to step 104, whereat scenario code data representative of the number (No. 1 in the beginning regardless of the direction) that was incremented in the direction corresponding to the operated key is transmitted to the system controller 31 of the second conference room 30 from the system controller 11 through the telephone network line 1. When the scenario code data is received by the system controller 31 of the second conference room 30, data of the corresponding code number stored in the scenario storage memory 34 connected to the system controller 31 is read out from the memory 34 in step 105. Then, an instruction signal is supplied from the system controller 31 to the video equipment on the second conference room 30 side represented by the read-out data so that the video equipment outputs the recorded video signal, i.e., a picture of a picture code (document code, frame code, index code) represented by the data thus read out is output in step 106. This output picture is displayed on the television monitor 38 in the second conference room 30. When data are stored in the memory 14 in the sequential order shown in FIG. 4, for example, if the scenario code 1 is designated, then the data corresponding to document code 1 is produced by the magneto-optical disc apparatus 23 and then displayed.

Insofar as the picture display mode is not changed, scenario code data of the code number incremented in the direction corresponding to the operated key is transmitted each time the forward key 13a or backward key 13b of the simple commander 13 in the first conference room 10 is operated and then the display of the picture is changed in accordance with the scenario.

Though not shown in the flow chart of FIG. 6, when the scenario code data is transmitted to the system controller 31 from the system controller 11 in the first conference room 10, data of the corresponding code number stored in the scenario storage memory 14 also is read out to the system controller 11 and the picture of the corresponding code of the equipment represented by that data is output. Then, this picture is displayed on the respective television monitors 18 in the first conference room 10. The picture displayed on the respective television monitor 18 in the first conference room 10 and the picture displayed on the respective television monitor 38 in the second conference room 30 becomes the same accordingly.

Since the previously-prepared picture is simultaneously displayed in the two conference rooms 10, 30 as described above, the presentation can be simultaneously offered to those who attend the conference in the two conference rooms 10 and 30. The picture being displayed was not compressed, or was compressed with a small compression ratio, and was transmitted during a long period of time so that a clear picture having a high resolution can be displayed. If the resolution of a still picture is high, particularly when a still picture such as a document on which characters or the like are written is displayed, then the content of the document can be understood with ease, which can make the conference progress smoothly. Further, during the conference, those present are required to operate only the forward key 13a or backward key 13b of the simple commander 13 on the console 24, which is very simple and easy. Therefore, the person present who makes the presentation can operate the forward key 13a or backward key 13b with ease during the conference and an expert is not needed.

Although all pictures are transmitted in advance as described above, if a moving picture such as a picture played back from the VTR, for example, is not compressed and transmitted, then the amount of data is considerably increased and the transmission time is increased accordingly. Therefore, a moving picture that does not need high resolution may be transmitted in a real time fashion even in the previously-prepared picture display mode. In this case, data representing that the picture of the corresponding scenario code is a signal transmitted in a real time fashion is stored in the scenario storage memory.

Figure 7:
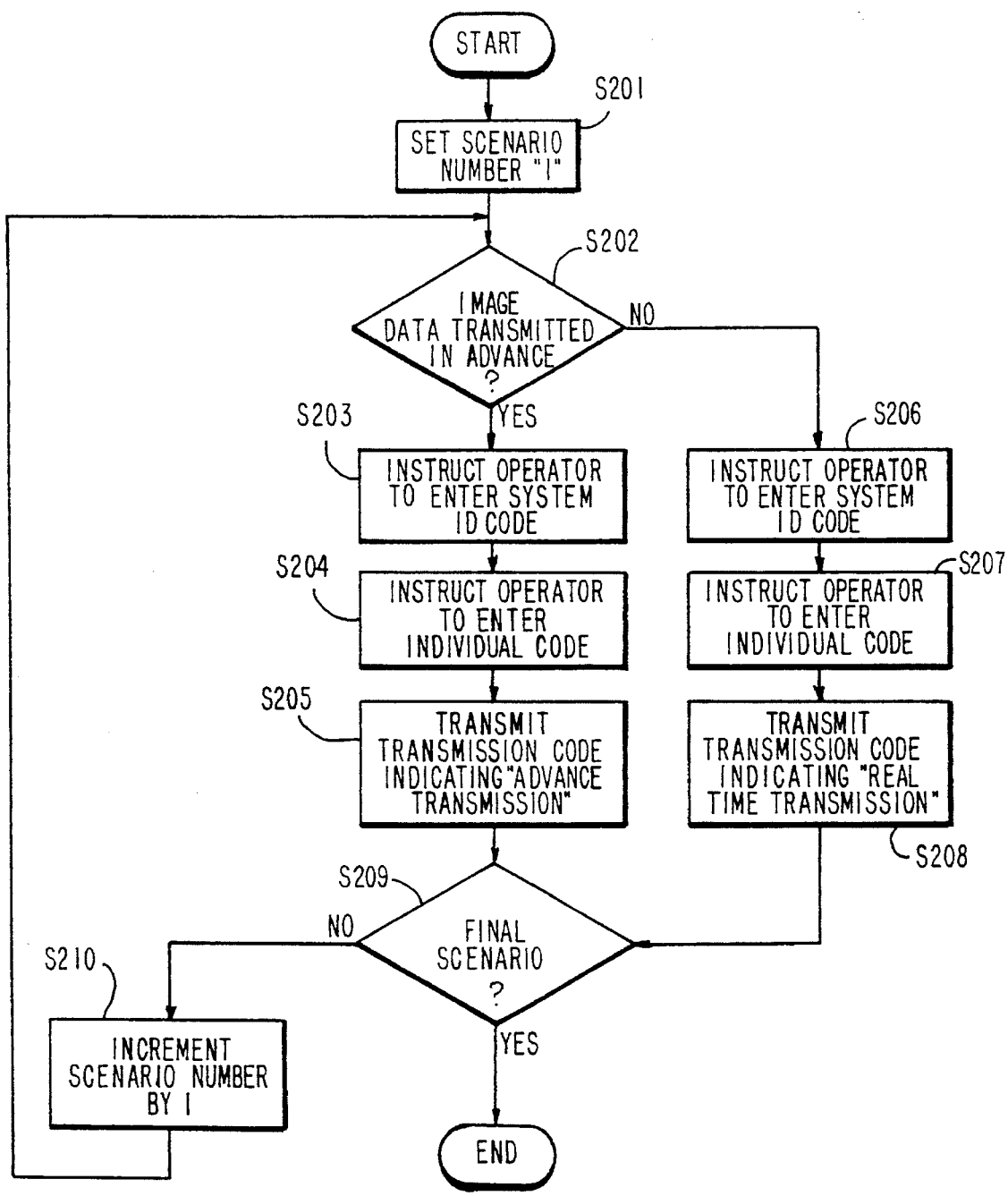
FIG. 7 is a flow chart explaining an operation executed on the transmission side when a scenario number is registered.

FIG. 7 is a flow chart to which reference will be made in explaining an operation for registering the scenario data, that is, setting the scenario code, in the case where data represent that the stored picture is either an advance transmission or a real time transmission. Operations represented in this flow chart are executed by the system controller 11.

Referring to FIG. 7, following the start of operation a scenario number "1" is set at step S201. Then, the processing proceeds to the next decision step S202, whereat it is determined whether image data is to be transmitted in advance. The decision step S202 is determined on the basis of the result obtained when the operator manipulates the touch-sensitive panel 12. Alternatively, it is possible to automatically determine the decision step S202 by a detected result obtained by detecting a network line speed of the telephone network line 1. In such case, if it is determined at decision step S202 that the network line speed of the telephone network line 1 is a predetermined low value, then the image data is transmitted beforehand because it takes a relatively long time to transmit the image data in a real time fashion. If it is determined in decision step S202 that the network line speed of the telephone network line 1 is a predetermined high value, then it is possible to transmit the image data in a real time fashion because it does not take a long time to transmit compressed image data in real time.

If a YES is output at decision step S202, that is, the image data is transmitted beforehand, then the processing proceeds to step S203, whereat the operator is instructed to enter the system ID code. When the system ID code is entered by the operator at step S203, then the processing proceeds to step S204, whereat the operator is instructed to enter the individual code. When the individual code is entered by the operator at step S204, the processing proceeds to step S205, whereat the transmission code indicative of the advance transmission, the scenario number, the system ID code, and the individual code are transmitted from the transmitting and receiving apparatus 2 in one conference room to the transmitting and receiving apparatus 3 in the other conference room. The transmitted transmission code and so on are stored in the memory 34. If a NO is output at decision step S202 it means that the image data is transmitted in a real time fashion, and the processing proceeds to step S206, whereat the operator is instructed to enter the system ID code. When the system ID code is entered by the operator at step S206, the processing proceeds to step S207, whereat the operator is instructed to enter the individual code. When the individual code is entered by the operator at step S207, the processing proceeds to step S208, whereat the transmission code indicating the real time transmission, the scenario number, the system ID code and the individual code are transmitted from the transmitting and receiving apparatus 2 in the one conference room to the transmitting and receiving apparatus 3 in the other conference room. The transmitted transmission code and so on are stored in the scenario memory 34. It is then determined in decision step S209 whether the scenario is the final or last scenario. If the scenario is not the final scenario as represented by a NO at decision step S209, then the processing proceeds to step S210, whereat the scenario number is incremented by 1 and the process returns to step S202. If on the other hand, the scenario is the final scenario as represented by a YES at decision step S209, then the process is ended.

Incidentally, of the image data based on the scenario thus made, the advance transmission image data is transmitted from the transmission side to the reception side together with the scenario number at some time other than the time of the processing shown in FIG. 7.

Figure 8:
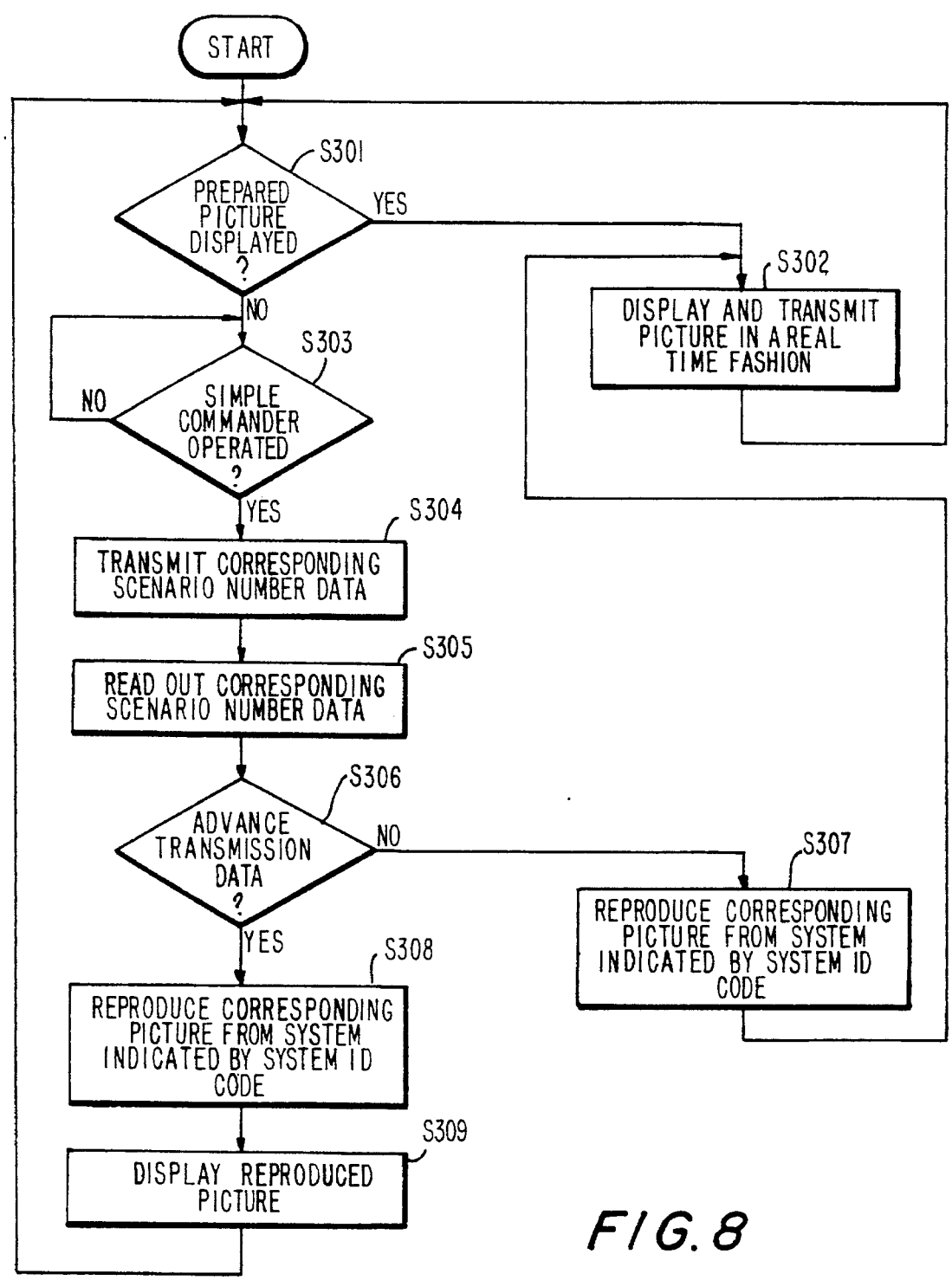
FIG. 8 is a flow chart explaining an operation executed on the transmission side by the system controller when the conference is held and both previously-stored and current video data are transmitted.

It is possible that a picture that is immediately needed for a conference must be displayed but has not been previously-prepared, stored, and transmitted from the transmitting and receiving apparatus 2 to the transmitting and receiving apparatus 3 as described hereinabove. FIG. 8 is a flow chart used to explain execution of the transmission under such circumstances, wherein following the start of operation, it is determined in decision step S301 whether a picture that is prepared now specifically for the conference at that time, is displayed and is to be transmitted. That is, when a picture that is immediately needed in the conference is displayed in step S301, such as a picture that was recorded by a scanner in the magneto-optical disc 23 on the very day of the conference or when a picture that is presently being taken by the video camera 16 is displayed, as represented by a YES at decision step S301, then the processing proceeds to step S302. On the other hand, if a picture that is already registered on the scenario is displayed, as represented by a NO at decision step S301, then the processing proceeds to step S303. The picture that is immediately needed in the conference may, of course, also be a picture that was previously recorded on the VTR 20. In step S302, a picture reproduced from the magneto-optical disc 23 or the like is displayed on the monitor receiver 18 and transmitted in real time to the second conference room 30 through the telephone network line 1 from the transmitting and receiving apparatus 2 and then the process returns to step S301. On the other hand, it is determined in decision step S303 whether the simple commander is operated, and if the simple commander is operated as represented by a YES at decision step S303, then the processing proceeds to step S304, whereat the corresponding scenario number data is transmitted through the transmitting and receiving apparatus 2 to the transmitting and receiving apparatus 3. Then, the processing proceeds to step S305, whereat corresponding scenario number data are read out from the transmitting and receiving apparatus 3. Data read out at step S305 are the system ID code, the individual code and the transmission code. Then, the processing proceeds to the next decision step S306, whereat it is determined whether the transmission data read out at step S305 indicates advance transmission data or real time transmission data. If the transmission data indicates the real time transmission data as represented by a NO at decision step S306, then the processing proceeds to step S307, whereat a corresponding picture is reproduced from the particular system indicated by the system ID code. Then, the processing returns to step S302, whereat the reproduced picture is displayed by the monitor receiver 18 and transmitted to the transmitting and receiving apparatus 3 through the telephone network line 1 from the transmitting and receiving apparatus 2. If the transmission data indicates the advance transmission data, as represented by a YES at decision step S306, then the processing proceeds to step S308, whereat a corresponding picture is reproduced from the particular system indicated by the system ID code. Then, the processing proceeds to step S309, whereat the reproduced picture is displayed by the monitor receiver 18 and the process returns to step S301. It should be noted that the picture being displayed in step S309 is not transmitted by the transmitting and receiving apparatus 2.

The scenario code corresponding to the processing shown in FIG. 8 is shown in FIG. 9, which shows the inclusion of transmission codes and also shows, at scenario number 5, the situation where the data to be displayed is a picture that is prepared at the present moment.

Figure 10:
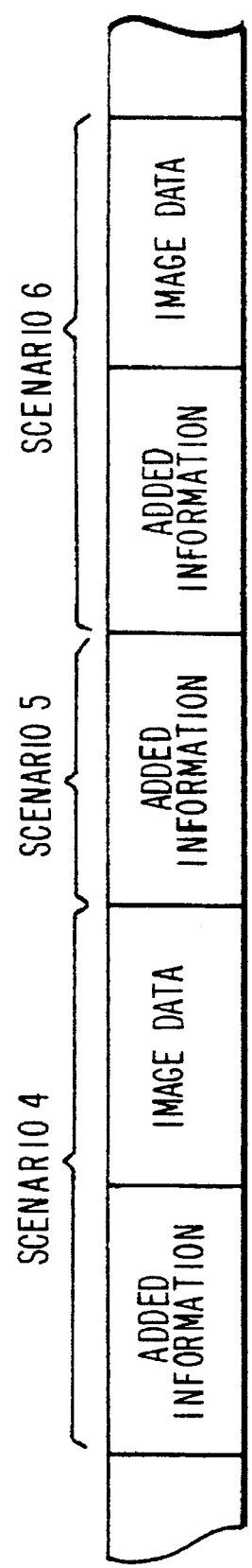
FIG. 10 is a diagram of a format used to explain the state in which image data as stored in the scenario code of FIG. 9 is transmitted in the teleconference system of the present invention.

FIG. 10 of the accompanying drawings shows a format of transmission data corresponding to the data of FIG. 9. As shown in FIG. 10, the data is transmitted in the form of frames, not related to the frame of a video signal, wherein data such as the system ID code, the individual code, and the scenario code are added to the image data, including the document data, to form one frame unit. In the case where there is no stored image data, such as the case where a picture prepared at the present moment is to be displayed, the added information alone comprises the transmission data.

Figure 11:
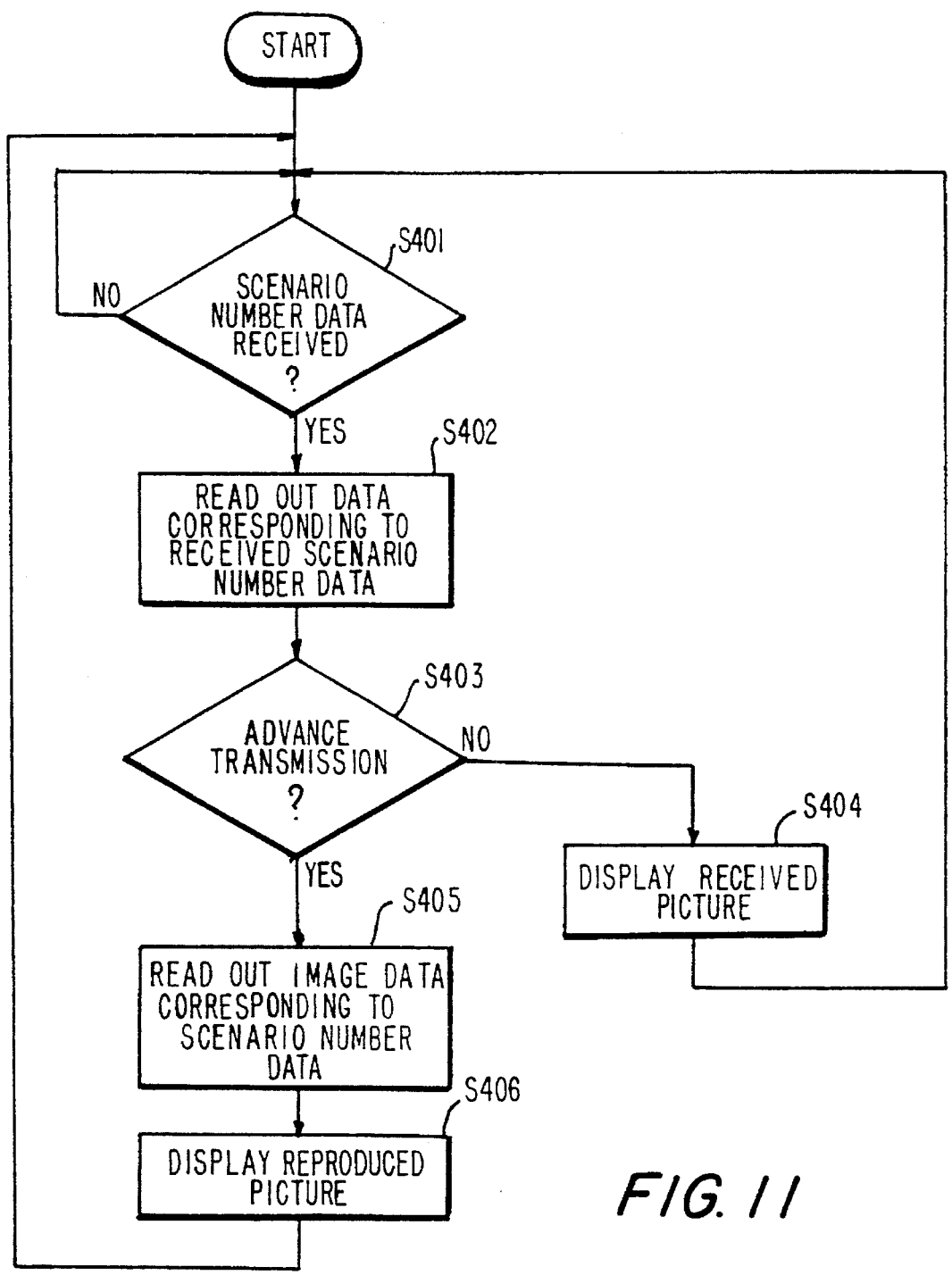
FIG. 11 is a flow chart explaining an operation executed on the reception side by the system controller when the conference is held.

The operation of displaying data at the transmitting and receiving apparatus 3 will now be described with reference FIG. 11, which shows a process executed by the system controller 31 when the conference is held. It is assumed that, when the previously-prepared picture is transmitted, the transmitted picture is displayed by the monitor receiver 38. As shown in FIG. 11, following the start of operation, it is determined in decision step S401 whether scenario number data is received. The decision step S401 is repeated until the transmitting and receiving apparatus 3 receives the scenario number data. If the scenario number data is received as represented by a YES at decision step S401, then the processing proceeds to step S402, whereat data corresponding to the received scenario number data is read out from the scenario memory 34. The data read out at step S402 include the system ID code, the individual code and the transmission code. Then, the processing proceeds to the next decision step S403, whereat it is determined whether the transmission code thus read out indicates the advance transmission data or the real time transmission data. If the transmission code indicates the real time transmission data, as represented by a NO at decision step S403, then the processing proceeds to step S404, whereat the picture received by the transmitting and receiving apparatus 3 is displayed by the monitor receiver 38. If, on the other hand, the transmission code indicates the advance transmission data as represented by a YES at decision step S403, then the processing proceeds to step S405, whereat image data corresponding to the scenario number data is read out from the scenario memory 34. Then, the processing proceeds to step S406, whereat a reproduced picture is displayed by the monitor receiver 38 and the process returns to step S401.

Although pictures are sequentially displayed in accordance with the present scenario as described above, pictures may also be displayed in an order different than the order determined by the scenario code. In that case, pictures can be displayed in a different order by pressing the forward key 13a or backward key 13b of the simple commander 13 a number of times until the picture is displayed. Alternatively, by operating the touch-sensitive panel 12, a specific scenario code may be directly designated in order to display the desired picture. Furthermore, a ten-key selector that can directly designate the scenario code is provided on the simple commander, so that pictures to be displayed may be selected in an arbitrary order by operating the simple commander.

While the same picture is displayed on the television monitors 18 and 38 in both the first and second conference rooms 10 and 30 as described above, a picture may be displayed only on the television monitors 18 of the first conference room 10 in accordance with the set scenario by the operation on the console 24 in the first conference room 10. In that case, only the scenario code data must be stored in the scenario storage memory in advance and the scenario code data need not be transmitted in advance to the other conference room via the telephone network line.

Conversely, if the same control data or the like is transmitted from the first conference room 10 to two or more conference rooms, then the presentation based on the scenario can be made in three or more conference rooms.

While only the transmission of the pictures from the video equipment is controlled in accordance with the scenario as described above, other control operations may be effected. When a television monitor of the type in which a picture is projected onto a picture screen by a projector is utilized, for example, data that controls an illumination apparatus is added to image data or document data as scenario data stored in the scenario memory and the illumination of the conference room is automatically reduced based on the added control data because the illumination of the conference room must be reduced when a picture is projected on the picture screen by the projector.

While only the display of pictures has been described so far, the present invention is not limited thereto and variations are also possible. For example, the displayed picture may be printed out as a hard copy or some data may be written in the displayed picture. At that time, the above modification may be effected either in a centralized control fashion wherein all conference rooms are controlled only by the console 24 of the first conference room 10 that controls the transmission of video signals or in a manner wherein conference rooms are controlled individually by utilizing consoles of respective conference rooms. When all conference rooms are controlled in a centralized control fashion, control data representative of the centralized control operation must be transmitted via the telephone network line 1.

While data transmission is effected among a plurality of conference rooms via the telephone network line as described above, the present invention is not limited thereto and may be applied to the case in which data is transmitted by means of other communication systems such as a variety of radio communications, such as ground system communication by radio waves, satellite communication, and communication via an infrared signal.

Furthermore, while the present invention is applied to an electronic teleconference system based on communication among the conference rooms as described above, the present invention is not limited thereto and pictures displayed in places other than the conference room can be similarly controlled by utilizing a telephone network line or the like.

According to the present invention, pictures such as the previously-prepared documents or the like can be sequentially displayed at different positions by only switching the display. Also, pictures such as the previously-prepared documents can be displayed with ease at the position in which the switching operation is carried out.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A teleconference system comprising:

a data transmitting apparatus including a plurality of data playback devices containing respective display data, a display data selection device for selecting display data to be displayed, and first scenario storage memory means containing scenario code data representative of an order in which said display data selected by said selection device is to be displayed; and a data receiving apparatus including display means for displaying display data, second scenario storage memory means for storing therein said scenario code data transmitted from said data transmitting apparatus, data memory means for storing therein display data transmitted from said data transmitting apparatus and corresponding to said scenario code data, and control means responsive to a display switching signal transmitted from said data transmitting apparatus in accordance with a switching operation executed by a user for reading said scenario code data stored in said second scenario storage memory means and for sequentially reading said display data from said data memory means in accordance with the display order represented by said scenario code data and supplying same to said display means, wherein said scenario code data includes transmission code data indicating whether respective display data is advance transmission data or real time transmission data.

2. The teleconference system according to claim 1, wherein said data transmitting apparatus includes second data memory means for storing therein display data, information generating means for generating said scenario code data, and switching means for generating said display switching signal representative of an increment of said scenario code data which increments in accordance with an operation of a forward key or a backward key.

3. A teleconference system as claimed in claim 1, wherein said display data comprises moving pictures and still pictures, said moving pictures being compressed before being transmitted from said data transmitting apparatus to said data receiving apparatus and said still pictures being transmitted without being compressed.

4. A teleconference system comprising:

a first data transmitting and receiving apparatus; and a second data transmitting and receiving apparatus, wherein each of said first and second data transmitting and receiving apparatus includes display means for displaying display data, data memory means for storing therein display data, information generating means for generating scenario code data representative of an order in which said display data stored in said data memory means is displayed, scenario storage memory means for storing therein said scenario code data, switching means for generating a display switching signal which increments said scenario code data in accordance with an operation of a forward key or a backward key by a user, and control means responsive to said display switching signal supplied from said switching means for reading said scenario code data from said scenario storage memory means and for sequentially reading said display data from said data memory means in accordance with a display control order represented by said scenario code data and supplying the same to said display means, and wherein said display data is transmitted at least between said first data transmitting and receiving apparatus and said second data transmitting and receiving apparatus and said scenario code data includes transmission code data indicating whether respective display data is advance transmission data or real time transmission data.

5. The teleconference system according to claim 4, wherein said data memory means is a magneto-optical disc apparatus.

6. A teleconference system comprising:

display means for displaying display data;

data memory means for storing therein display data;

information generating means for generating scenario code data representative of an order in which said display data stored in said data memory means is displayed on said display means;

scenario storage memory means for storing therein said scenario code data;

switching means for generating a display switching signal which increments said scenario code data in accordance with an operation of a forward key or a backward key by a user; and control means responsive to said display switching signal supplied from said switching means for reading said scenario code data from said scenario storage memory means and for sequentially reading said display data from said data memory means in accordance with the display order represented by said scenario code data and supplying same to said display means, wherein said scenario code data includes transmission code data indicating whether respective display data is advance transmission data or real time transmission data.

7. A teleconference system comprising:

a data transmitting apparatus including a plurality of data playback devices containing respective display data, a device for transmitting real time transmission data, a data selection device for selecting display data and real time transmission data to be displayed, and first scenario storage memory means containing scenario code data representative of an order in which said display data and said real time transmission data selected by said selection device is to be displayed; and a data receiving apparatus including display means for displaying display data and real time transmission data, data memory means for storing therein advance transmission display data transmitted from said data transmitting apparatus, second scenario storage memory means for storing therein said scenario code data transmitted from said data transmitting apparatus, and control means responsive to a display switching signal transmitted from said data transmitting apparatus in accordance with a switching operation executed by a user for reading said scenario code data stored in said second scenario storage memory means and for sequentially reading said advance transmission display data from said data memory means and said real time transmission data transmitted from said data transmitting apparatus in accordance with a display order represented by said scenario code data and supplying same to said display means, wherein said scenario code data includes transmission code data indicating whether respective data to be displayed is advance transmission data or real time transmission data.

8. A teleconference system as claimed in claim 7, wherein said display data comprises moving pictures and still pictures, said moving pictures being compressed before being transmitted from said data transmitting apparatus to said data receiving apparatus and said still pictures being transmitted without being compressed.

9. A method for transmitting data from a first teleconference system to a second teleconference system, comprising the steps of:

transmitting scenario code data representative of an order in which display data comprising advance transmission display data and real time transmission display data is to be displayed from the first teleconference system to the second teleconference system;

storing said scenario code data in a scenario code storage memory means of the second teleconference system;

transmitting said advance transmission display data from the first teleconference system to the second teleconference system;

storing said advance transmission display data in data memory means of the second teleconference system;

displaying display data stored in said data memory means corresponding to the advance transmission display data of a selected scenario code; and displaying display data corresponding to the real time transmission data of a selected scenario code, wherein said real time transmission data is transmitted from the first teleconference system to the second teleconference system during the conference.

10. A method according to claim 9, further comprising the step of operating a simple commander to select a next sequential scenario code.

11. A method according to claim 9, further comprising the steps of:

determining whether the display data is advance transmission display data or real time transmission display data; and transmitting the real time transmission video data from the first teleconference system to the second teleconference system in real time.

12. A method according to claim 9, further comprising the step of setting the scenario code data by sequentially entering the system identification code, the individual code, and the transmission code of each display data to be displayed.

* * * * *